Figure 1:
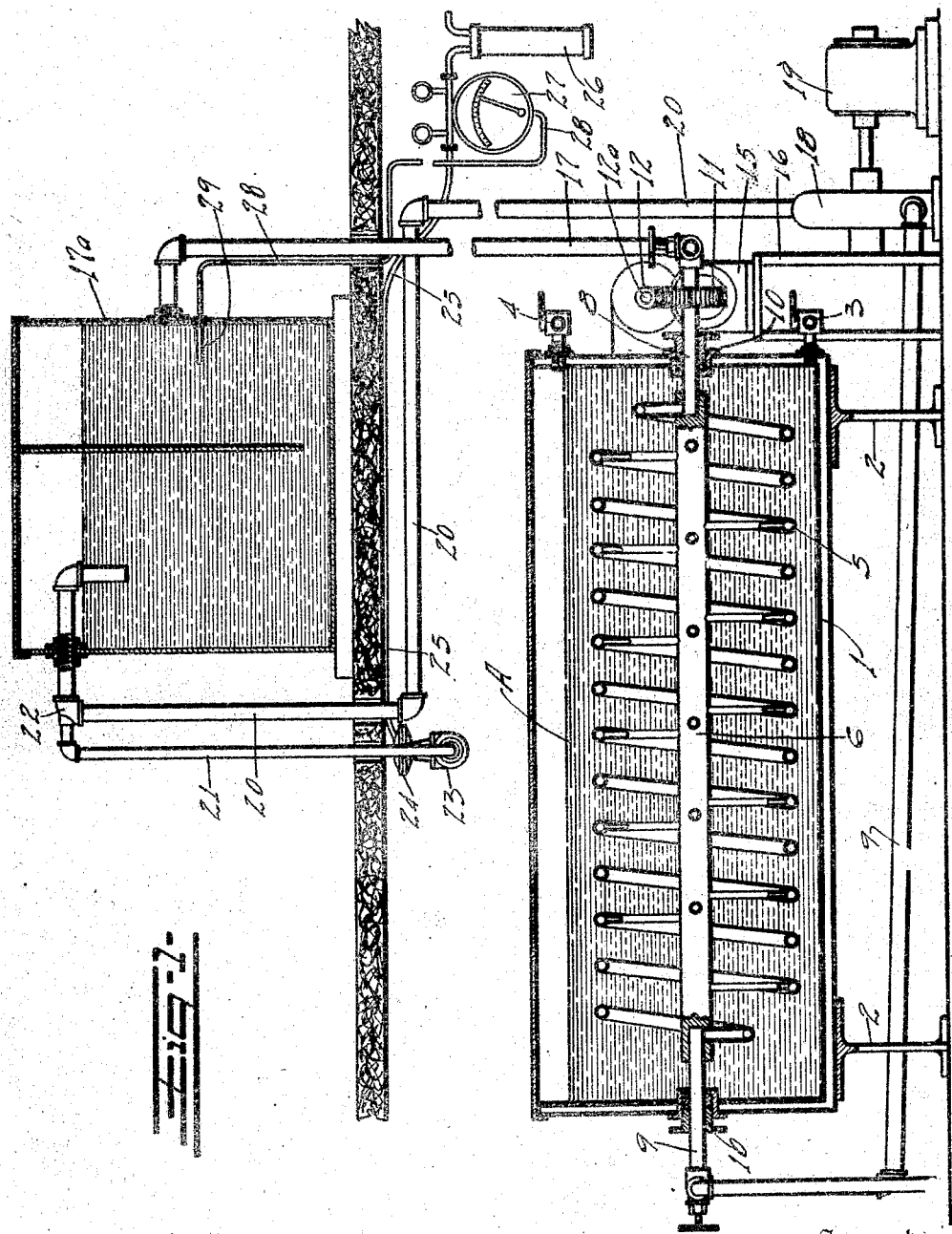

Aug. 25, 1925.

D. E. WISEMAN 1,550,860

METHOD OF PASTEURIZING MILK

Filed Dec. 27, 1922   3 Sheets-Sheet 1

Inventor
Don E. Wiseman

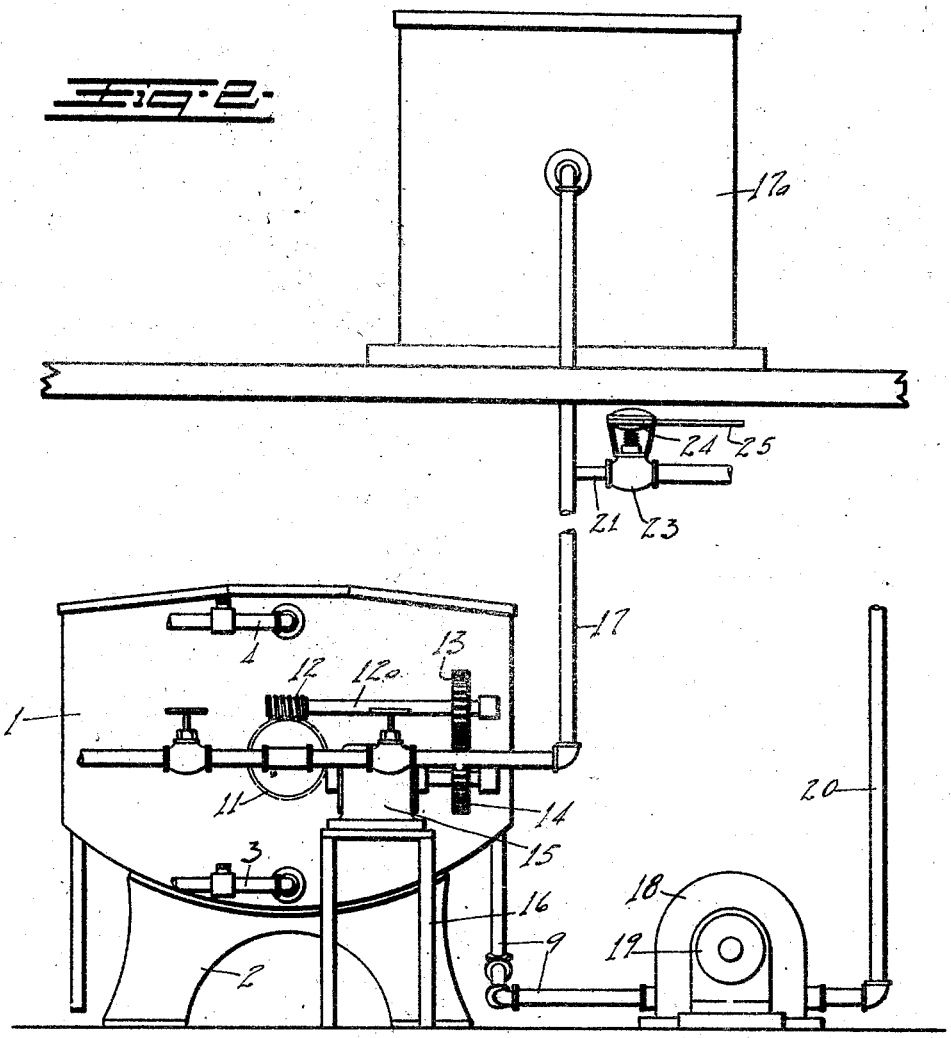

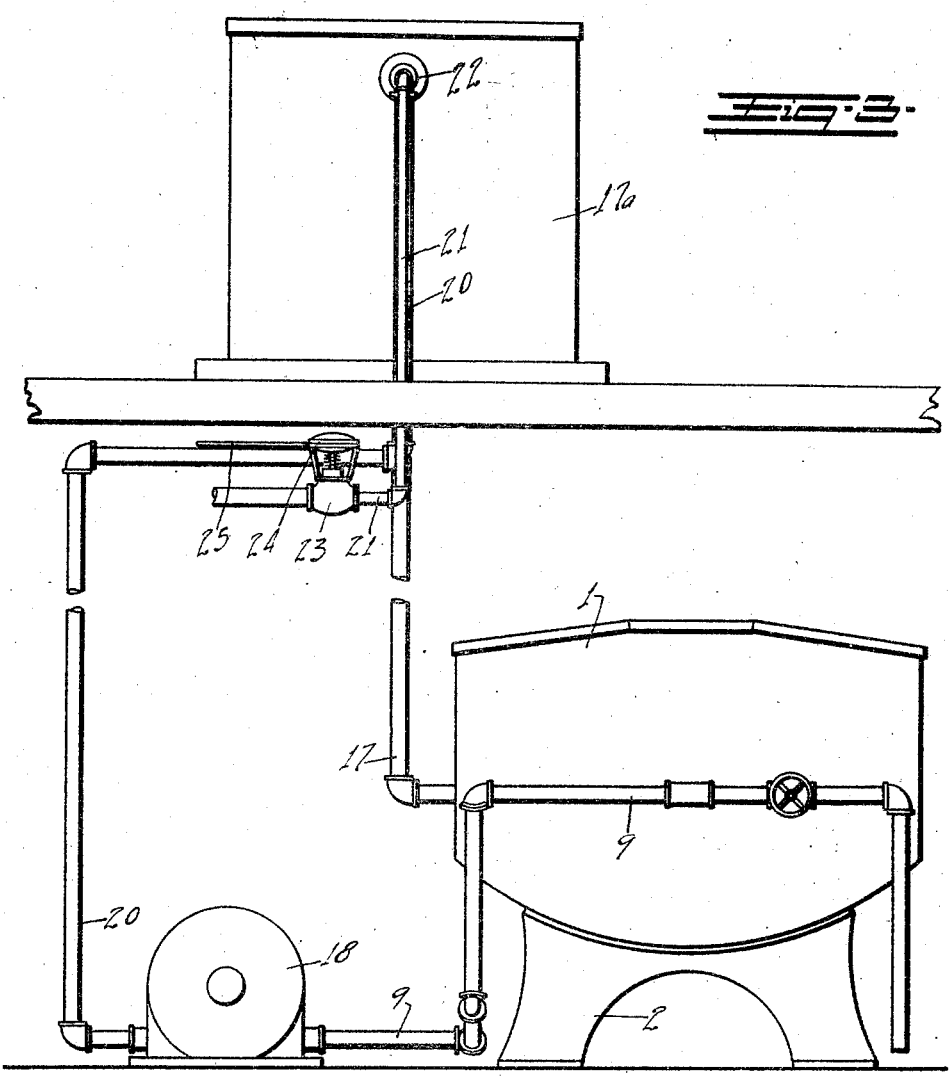

Patented Aug. 25, 1925.

1,550,860

UNITED STATES PATENT OFFICE.

DON E. WISEMAN, OF ERIE, PENNSYLVANIA, ASSIGNOR TO ERIE COUNTY MILK ASSOCIATION, OF ERIE, PENNSYLVANIA, A CORPORATION OF PENNSYLVANIA.

METHOD OF PASTEURIZING MILK.

Application filed December 27, 1922. Serial No. 609,181.

*To all whom it may concern:*

Be it known that I, DON E. WISEMAN, a citizen of the United States, residing at Erie, in the county of Erie and State of Pennsylvania, have invented new and useful Improvements in the Methods of Pasteurizing Milk, of which the following is a specification.

Pasteurized milk as now commercially handled has a slight taste which readily differentiates the Pasteurized milk from raw milk. I have discovered that the reason for this is that in the Pasteurizing process some parts of the heating surfaces are above what might be termed a scorching temperature and however small the portion of the surface may be that has this higher temperature this scorched flavor is given to the entire product. In one of the modern methods of Pasteurizing steam is injected into the end of a coil thus forcing to some extent the circulation of water or heating medium through the coil. The difficulty with this method is that the rate of circulation is slow and there is an excess of scorching heat at the inlet end of the coil and the outlet end of the coil has very little heating temperature if the coil is of any capacity particularly when the milk is at the lower temperatures. It is desirable also to raise the temperature of the milk rapidly to above 120° F. so as to kill the spores of fermentation and it is also desirable to maintain a temperature of the milk below 146° F. to prevent the bursting of the butter-fat globules.

In carrying out my process I retain the heating surfaces below a scorching temperature and in my preferred method have a sufficient heating surface capacity of heating medium to raise the milk rapidly to 120° F. and to maintain the milk as a whole below 146° F. The invention also contemplates an apparatus for carrying out the method. Other details or features of the invention will appear from the specification and claims.

The apparatus by which the method may be practiced is illustrated in the accompanying drawings as follows:—

Fig. 1 shows a central section through the apparatus.

Fig. 2 an end elevation of the same.

Fig. 3 an end elevation of the opposite side of the apparatus.

1 marks the Pasteurizing tank having a volume of milk A to be Pasteurized. This is supported by a frame 2. Milk is drawn off through the pipes 3 and delivered through the pipes 4.

A heating coil 5 is mounted on a shaft 6, one end of the shaft being extended by a pipe 8 connecting with one end of the coil and the opposite end of the shaft connecting with a pipe 9 receiving the discharge from the coil. The pipes 8 and 9 extend through the packed bearings 10 and the coil is rotated so as to agitate or cause a movement of the milk to keep the temperature of the body of the milk as a whole uniform. The coil is driven by a driving mechanism comprising a worm gear 11, a worm 12 operating on the worm gear 11, a shaft $12^a$ on which the worm is mounted, a gear 13 fixed on the shaft $12^a$, a gear 14 driving the shaft 13, and a motor 15 driving the gear 14, the motor being mounted on a platform 16.

A pipe 17 leads from the pipe 8 to a hot water tank $17^a$. The discharge pipe 9 leads to a centrifugal pump 18. The pump 18 is driven by a motor 19 and discharges through a pipe 20 to the tank $17^a$. A steam pipe 21 is introduced through a fitting 22 to the pipe 20 giving to the water some ejector effect and at the same time has sufficient volume to heat the water to the temperature desired.

The water is maintained at a temperature that will maintain the coil below 168° F. but preferably as high as possible throughout below that temperature, ordinarily a temperature of about 160° F. at the contacting surfaces.

The water is circulated through the coil at a very rapid rate through the action of the centrifugal pump assisted by the ejector effect of the steam jet and consequently the heat given off by the water throughout the length of the coil is comparatively small during the interval that the water is in the coil. In this way the whole coil can be kept at nearly the same temperature and thus there is a high heating capacity but with a temperature below scorching. It is, therefore, possible with this method to bring the milk rapidly to a temperature above 120° F. The temperature of the milk as a whole is brought up to the Pasteurizing temperature of 145° F. and can be maintained as desired for completing the Pasteurizing process. The milk Pasteurized by this method is entirely free from the scorching flavor which has characterized Pasteurized milk as now commonly produced.

I provide the apparatus with a common thermostatic controlling means. A controlling valve 23 has a motor 24 by which it is controlled. A pipe 25 leads from the motor to a source of supply 26. A thermostat 27 has a connection 28 leading to the thermal contact element 29 in the tank 17ª adjacent to the discharge. This apparatus through the thermostat 27 indicates the water temperature and at the same time controls the air valves on the line 25 in the well-known method to operate the steam valve 23 to effect the desired control of the temperature.

What I claim as new is:

1. The method of Pasteurizing milk which consists in heating the milk to a Pasteurized temperature by maintaining a circulating heating medium at a temperature to maintain the contact heating surfaces below 168° F.

2. The method of Pasteurizing milk which consists in heating the milk to a Pasteurized temperature by maintaining a circulating heating medium at a temperature to maintain the contact heating surfaces below 168° F. maintaining the milk temperature below 146° F.

3. The method of Pasteurizing milk which consists in heating the milk to a Pasteurized temperature by maintaining a circulating heating medium at a temperature to maintain the contact heating surfaces below 168° F. maintaining the circulating heating medium with sufficient volume and velocity to raise the milk temperature rapidly to above 120° F.

4. The method of Pasteurizing milk which consists in heating the same to a Pasteurized temperature by subjecting the same to the action of a coil through which is circulated a heating medium at a temperature to maintain the contact heating surfaces below 168° F. giving the milk movement past the coils.

5. The method of Pasteurizing milk which consists in raising the temperature of the milk rapidly to 120° F. by maintaining a circulating medium at a temperature to maintain the contact heating surfaces with the milk below 168° F. and maintaining the milk temperature below 146° F.

In testimony whereof I have hereunto set my hand.

DON E. WISEMAN.